(12) United States Patent
Claesen et al.

(10) Patent No.: US 12,401,520 B2
(45) Date of Patent: Aug. 26, 2025

(54) METHOD AND APPARATUS FOR POSTING A USER MESSAGE OF A USER IN AN INTERNET FORUM

(71) Applicant: Sony Group Corporation, Tokyo (JP)

(72) Inventors: Rik Claesen, Stuttgart (DE); Valerio Mattioli, Stuttgart (DE)

(73) Assignee: SONY GROUP CORPORATION, Tokyo (JP)

( * ) Notice: Subject to any disclaimer, the term of this patent is extended or adjusted under 35 U.S.C. 154(b) by 45 days.

(21) Appl. No.: 18/276,251

(22) PCT Filed: Feb. 4, 2022

(86) PCT No.: PCT/EP2022/052728
§ 371 (c)(1),
(2) Date: Aug. 8, 2023

(87) PCT Pub. No.: WO2022/207163
PCT Pub. Date: Oct. 6, 2022

(65) Prior Publication Data
US 2024/0106657 A1    Mar. 28, 2024

(30) Foreign Application Priority Data
Mar. 30, 2021    (EP) .................................. 21166098

(51) Int. Cl.
*H04L 9/32*    (2006.01)
*H04L 51/52*    (2022.01)

(52) U.S. Cl.
CPC ............ *H04L 9/3247* (2013.01); *H04L 51/52* (2022.05)

(58) Field of Classification Search
CPC ..... H04L 9/3247; H04L 51/52; H04L 9/0643; H04L 9/50
(Continued)

(56) References Cited

U.S. PATENT DOCUMENTS 10,069,841 B2    9/2018   Bedi
10,812,455 B1 *  10/2020  Reissner ................. G06F 21/64
(Continued)

OTHER PUBLICATIONS

International Search Report and Written Opinion mailed on May 13, 2022, received for PCT Application PCT/EP2022/052728, filed on Feb. 4, 2022, 11 pages.
(Continued)

*Primary Examiner* — Kaylee J Huang
(74) *Attorney, Agent, or Firm* — XSENSUS LLP

(57) ABSTRACT

A method comprising receiving, at a forum network node, a user request for posting a user message in an internet forum from a user network node. The user network node is associated with a digital identity of the user. The forum network node is associated with a digital identity of the internet forum. The forum network node has an interface to a distributed ledger. The user request indicates a parent post the user message relates to. The parent post is part of the internet forum. The method further comprises generating, at the forum network node, transaction data for the user message and a hash of the transaction data. The transaction data comprises a hash of the user message and a hash of the parent post. The method further comprises writing the hash of the transaction data and the transaction data on the distributed ledger.

17 Claims, 10 Drawing Sheets

300

| receiving, at a forum network node, a user request for posting the user message in the internet forum from a user network node, the user network node being associated with a digital identity of the user, the forum network node being associated with a digital identity of the internet forum, the forum network node having an interface to a distributed ledger, the user request indicating a parent post the user message relates to, the parent post being part of the internet forum | ~310 |

| generating, at the forum network node, transaction data for the user message and a hash of the transaction data, the transaction data comprising a hash of the user message and a hash of the parent post | ~320 |

| writing the hash of the transaction data and the transaction data on a distributed ledger | ~330 |

(58) Field of Classification Search
USPC .................................................. 713/180, 176
See application file for complete search history.

(56) References Cited

U.S. PATENT DOCUMENTS

| | | | |
|---|---|---|---|
| 2017/0192994 A1* | 7/2017 | Hong | G06F 16/164 |
| 2017/0243029 A1 | 8/2017 | Sprague et al. | |
| 2017/0344515 A1 | 11/2017 | Gevka et al. | |
| 2018/0343126 A1 | 11/2018 | Fallah et al. | |
| 2019/0079995 A1 | 3/2019 | Jin et al. | |
| 2019/0097812 A1 | 3/2019 | Toth | |
| 2019/0229890 A1* | 7/2019 | Brehmer | H04L 9/088 |
| 2019/0266146 A1* | 8/2019 | Rose | G06F 16/215 |
| 2020/0076601 A1 | 3/2020 | Tabrizi | |
| 2020/0084045 A1* | 3/2020 | Cohen | H04L 9/14 |
| 2020/0250667 A1 | 8/2020 | Ow et al. | |
| 2020/0314090 A1 | 10/2020 | Dantin, Jr. | |
| 2020/0387619 A1 | 12/2020 | Murdoch et al. | |
| 2022/0247573 A1* | 8/2022 | Li | H04L 9/3252 |

OTHER PUBLICATIONS

"CovenantForum/README.md", Available Online at: https://github.com/CovenantSQL/CovenantForum/blob/README.md, Mar. 15, 2019, pp. 1-6.

Reed et al., "The Basic Building Blocks of SSI", Self-Sovereign Identity, Available Online at: https://freecontent.manning.com/the-basic-building-blocks-of-ssi/, Accessed from Internet on Jun. 13, 2023, pp. 1-32.

Daniel Hardman, "Aries RFC 0004: Agents", GITHUB, Available Online at: https://github.com/hyperledger/aries-fcs/blob/master/concepts/0004-agents/README.md, Jan. 15, 2019, pp. 1-15.

"Intro to DIDs for people", MATTR, Available Online at: https://mattr.global/intro-to-dids-for-people/, Nov. 20, 2019, pp. 1-5.

"Decentralized Identifiers (DIDs) v1.0 Core architecture, data model, and representations" Available Online at: https://www.w3.org/TR/did-core/, Jul. 19, 2022, pp. 1-147.

* cited by examiner

FIG. 3

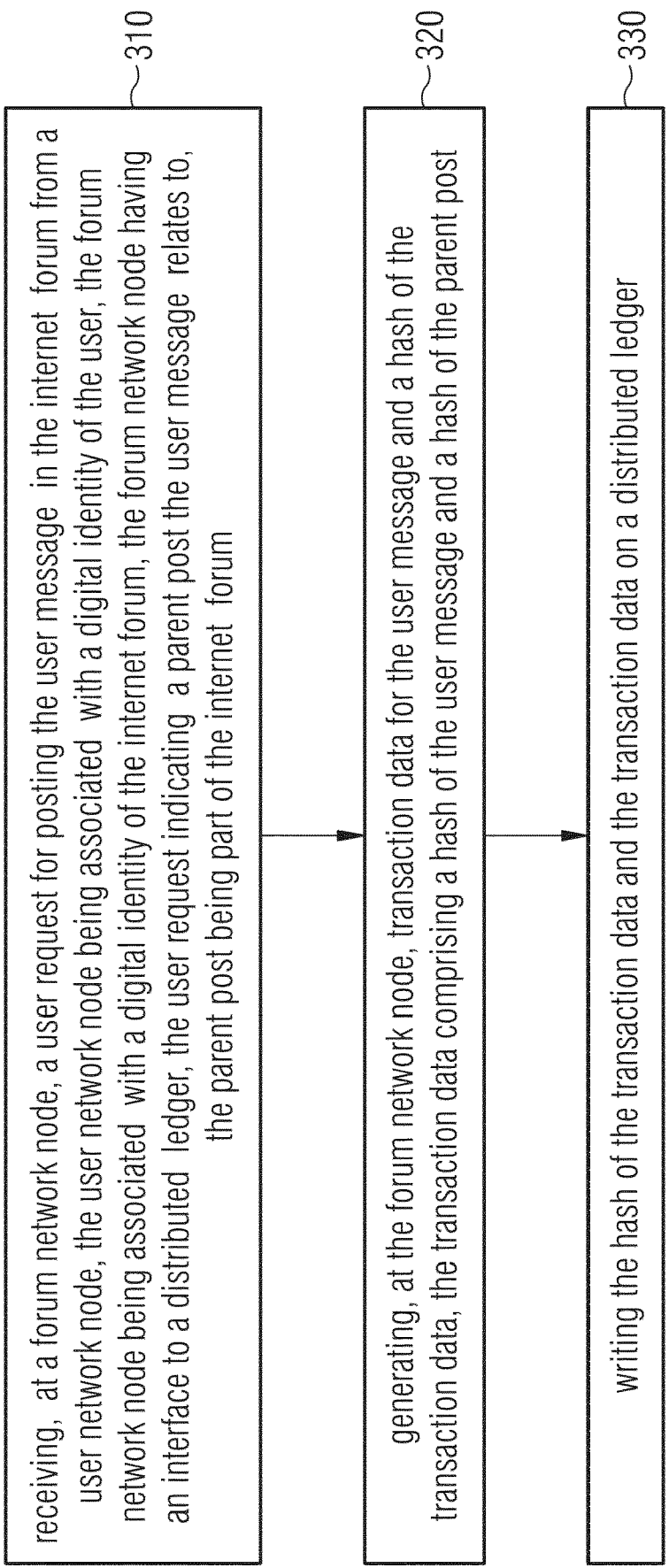

300

310 — receiving, at a forum network node, a user request for posting the user message in the internet forum from a user network node, the user network node being associated with a digital identity of the user, the forum network node being associated with a digital identity of the internet forum, the forum network node having an interface to a distributed ledger, the user request indicating a parent post the user message relates to, the parent post being part of the internet forum 320 — generating, at the forum network node, transaction data for the user message and a hash of the transaction data, the transaction data comprising a hash of the user message and a hash of the parent post 330 — writing the hash of the transaction data and the transaction data on a distributed ledger

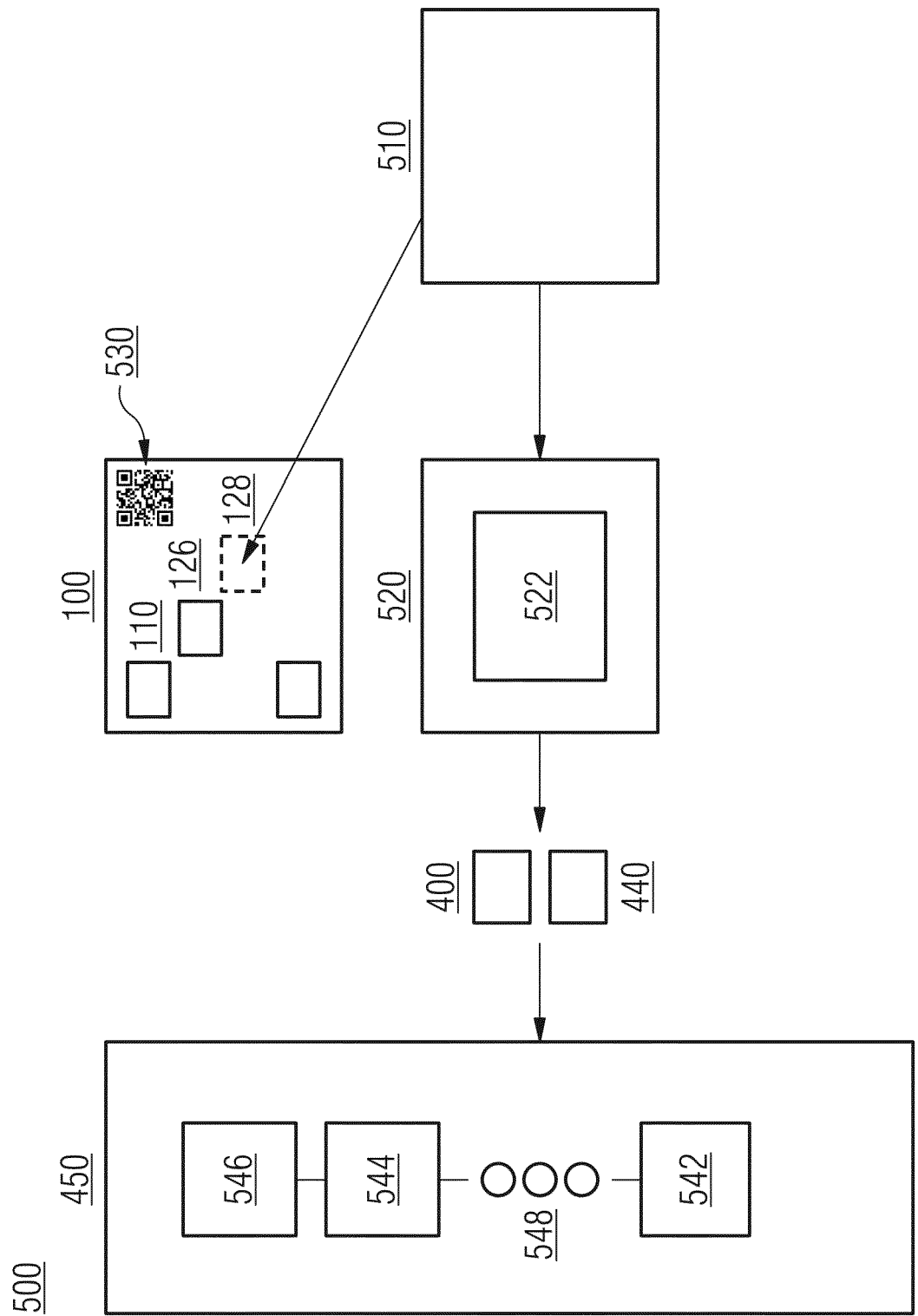

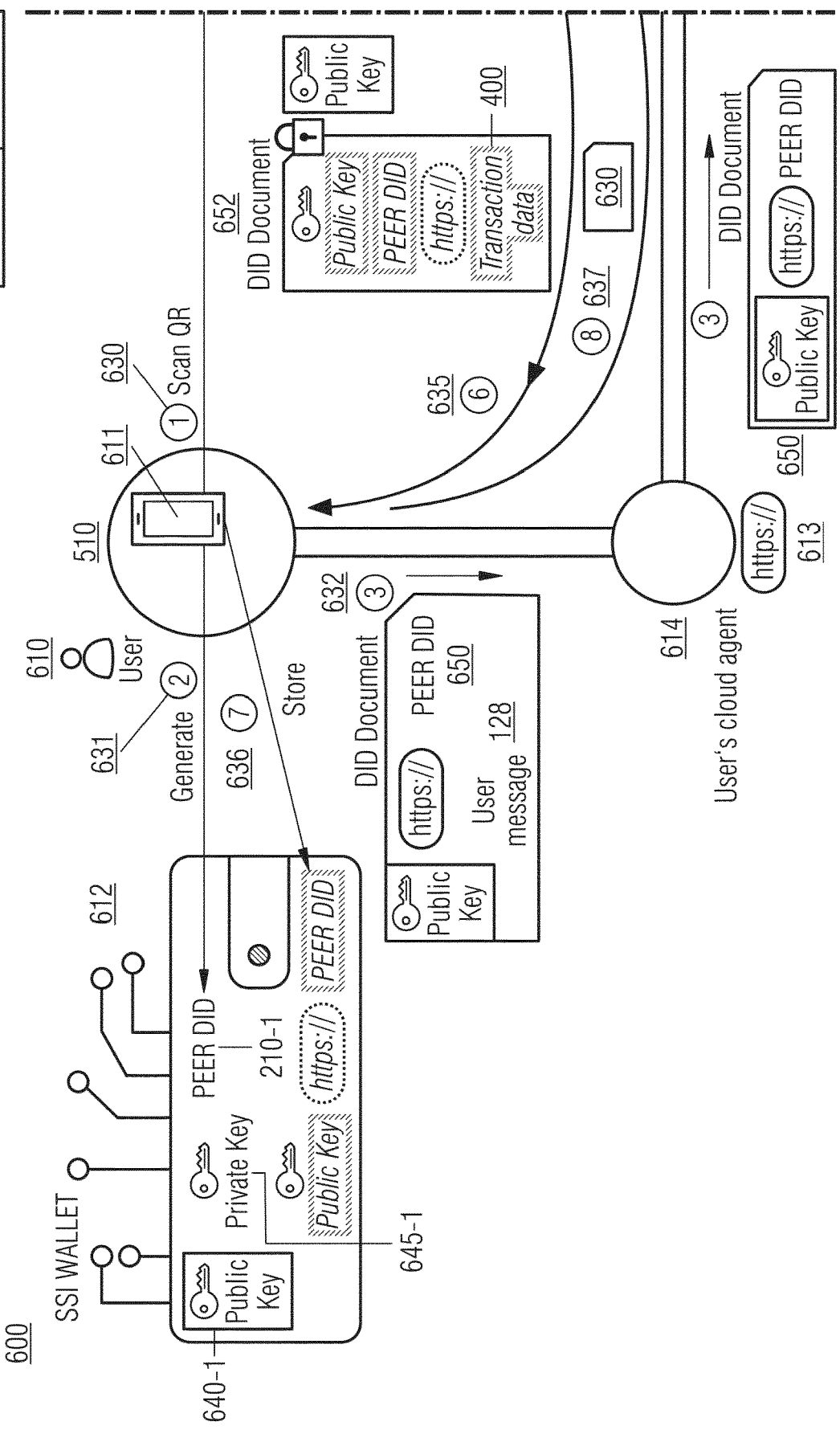

METHOD AND APPARATUS FOR POSTING A USER MESSAGE OF A USER IN AN INTERNET FORUM

CROSS-REFERENCE TO RELATED APPLICATIONS

The present application is based on PCT filing PCT/EP2022/052728, filed Feb. 4, 2022, which claims priority from European Patent Application Number EP 21166098.0, filed Mar. 30, 2021, the contents of each are hereby incorporated by reference.

FIELD

The present disclosure relates to methods and apparatuses for posting a user message of a user in an internet forum, in particular, by using distributed ledger technology.

BACKGROUND

The handling of user messages in internet forums evolved over the years from being integrated in the internet forums to pluggable applications managed by external web service providers. In either way, internet forum providers pay for the cost of storing the user messages on long-term data storages. The internet forum providers may commission the external web service providers to store and monitor the user messages as well as delete certain user messages according to a strategy of the external web services and independently of the internet forum providers. This leads to a centralization of control over the user messages, implying that the external web service providers may be able to censor the user messages according to financial or political interests the web service providers may represent. Which changes on user messages are made for what reason and what data retrieved from the user messages is used for may not be traceable neither for the internet forum providers nor for users of the internet forums. A user cannot prove that a user message originating from the user was removed, altered, or moved against his/her will.

In contrast to this centralized approach, distributed ledger technology (such as blockchain) uses globally distributed ledgers to record transactions between two or more parties in a verifiable way. Once a transaction is recorded, the transaction data in the section of ledger cannot be altered retroactively without the alteration of all subsequent sections of ledger, which provides a fairly secure platform. Distributed ledger technology also provides the opportunity for using decentralized identifiers (DIDs). DIDs are a new type of digital identifier, which are independent from any centralized registry, identity provider, or certificate authority.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

A need for improvement is addressed by the subject matter of the independent claims. Further, possibly advantageous embodiments are addressed by the dependent claims.

According to a first aspect of the present disclosure, it is provided a method for posting a user message of a user in an internet forum. The method comprises receiving, at a forum network node, a user request for posting the user message in the Internet forum from a user network node. The user network node is associated with a digital identity of the user, the forum network node is associated with a digital identity of the internet forum. The forum network node has an interface to a distributed ledger. The user request indicates a parent post the user message relates to. The parent post is part of the internet forum. The method further comprises generating, at the forum network node, transaction data for the user message and a hash of the transaction data, wherein the transaction data comprises a hash of the user message and a hash of the parent post. The method further comprises writing the hash of the transaction data and the transaction data on the distributed ledger.

In some embodiments, the method may further comprise sending, at the forum network node, the transaction data to the user network node for requesting a digital signature for the transaction data from the user network node, the digital signature proving the digital identity of the user.

In some embodiments, the method may further comprise receiving, at the forum network node, the digital signature for the transaction data from the user network node.

In some embodiments, the method may further comprise receiving, at the forum network node, the digital signature for the transaction data from a mediator network node, the mediator network node routing data between the forum network node and the user network node.

In soiree embodiments, the method may further comprise storing, at the forum network node, a network address of the user network node linked to the hash of the user message on a computer data storage.

In some embodiments, the method may further comprise refreshing the internet forum by reading prior transaction data stored in the distributed ledger. The prior transaction data may be priorly generated transaction data for at least one prior user message of at least one prior user of the internet forum. The method may further comprise looking up a hash of the at least one prior user message in the prior transaction data. The method may further comprise looking up a network address of at least one prior user network node linked to the hash of the at least one prior user message on the computer data storage. The at least one prior user network node may be associated with a digital identity of the at least one prior user. The method may further comprise, by using the network address of the at least one prior user network node, establishing a network path between the forum network node and the at least one prior user network node. The method may further comprise retrieving via the network path from the at least one prior user network node the at least one prior user message corresponding to the hash of the at least one prior user message.

In some embodiments, the method may further comprise caching, at the forum network node, a copy of the user message on a computer data storage.

In some embodiments, the method may further comprise verifying an integrity of the internet forum. Verifying the integrity may comprise reading prior transaction data stored in the distributed ledger. The prior transaction data may be priorly generated transaction data for at least one prior user message of at least one prior user of the internet forum. Verifying the integrity may further comprise looking up a hash of the at least one prior user message in the prior transaction data. Verifying the integrity may further comprise comparing the hash of the at least one prior user message with a hash of at least one forum post in the internet forum. The at least one forum post may correspond to the at least one prior user message.

According to a second aspect of the present disclosure, it is provided a computer program having a program code for perfolining a method as described above, when the computer program is executed on a programmable hardware device.

According to a third aspect of the present disclosure, it is provided an apparatus for posting a user message of a user in an internet forum. The apparatus comprises processing circuitry configured to receive, at a forum network node, a user request for posting the user message in the internet forum from a user network node. The user network node is associated with a digital identity of the user. The forum network node is associated with a digital identity of the internet forum. The forum network node has an interface to a distributed ledger. The user request indicates a parent post the user message relates to. The parent post is part of the internet forum. The processing circuitry is further configured to generate, at the forum network node, transaction data for the user message and a hash of the transaction data. The transaction data comprises a hash of the user message and a hash of the parent post. The processing circuitry is further configured to write the hash of the transaction data and the transaction data on the distributed ledger.

According to a fourth aspect of the present disclosure, it is provided an apparatus for posting a user message of a user in an internet forum. The apparatus comprises processing circuitry configured to send, at a user network node, a user request for posting the user message in the internet forum to a forum network node. The user network node is associated with a digital identity of the user. The forum network node is associated with a digital identity of the internet forum. The user request indicates a parent post the user message relates to. The parent post is part of the internet forum. The processing circuitry is further configured to store, at a user network node, the user message on a user data storage. The user data storage is managed by the user. The processing circuitry is further configured to receive, at the user network node, transaction data from the forum network node. The transaction data comprises a hash of the user message and a hash of the parent post. The processing circuitry is further configured to sign, at the user network node, the transaction data with a digital signature using a digital identifier.

According to a fifth aspect of the present disclosure, it is provided a system for posting a user message of a user in an internet forum. The system comprises processing circuitry configured to send, at a user network node, a user request for posting the user message in the internet forum to a forum network node. The user network node is associated with a digital identity of the user, the forum network node is associated with a digital identity of the internet forum. The forum network node has an interface to a distributed ledger. The user request indicates a parent post the user message relates to. The parent post is part of the internet forum. The processing circuitry is further configured to store, at a user network node, the user message on a user data storage. The user data storage is managed by the user. The processing circuitry is further configured to receive, at the forum network node, the user request and retrieve, at the forum network node, a hash of the parent post from a distributed ledger. The processing circuitry is further configured to generate, at the forum network node, transaction data for the user message and a hash of the transaction data, wherein the transaction data comprises a hash of the user message and the hash of the parent post. The processing circuitry is further configured to send, at the forum network node, the transaction data to the user network node for requesting a digital signature for the transaction data from the user network node, wherein the digital signature proves the digital identity of the user. The processing circuitry is further configured to receive, at the user network node, the transaction data from the forum network node and sign, at the user network node, the transaction data with the digital signature using a digital identifier of the user network node. The processing circuitry is further configured to receive, at the forum network node, the digital signature for the transaction data from the user network node and write, at the forum network node, the transaction data on the distributed ledger.

Embodiments according to the present disclosure can overcome issues related to internet forums by storing transaction data about user messages on a distributed ledger. Thus, user messages posted on the internet forum are recorded and alterations can be tracked publicly.

BRIEF DESCRIPTION OF THE FIGURES

Some examples of apparatuses and/or methods will be described in the following by way of example only, and with reference to the accompanying figures, in which

FIG. 3 illustrates a method for posting a user message of a user in the internet forum;

FIG. 5 illustrates an apparatus for posting the user message of the user in the internet forum;

DETAILED DESCRIPTION

Figure 1:
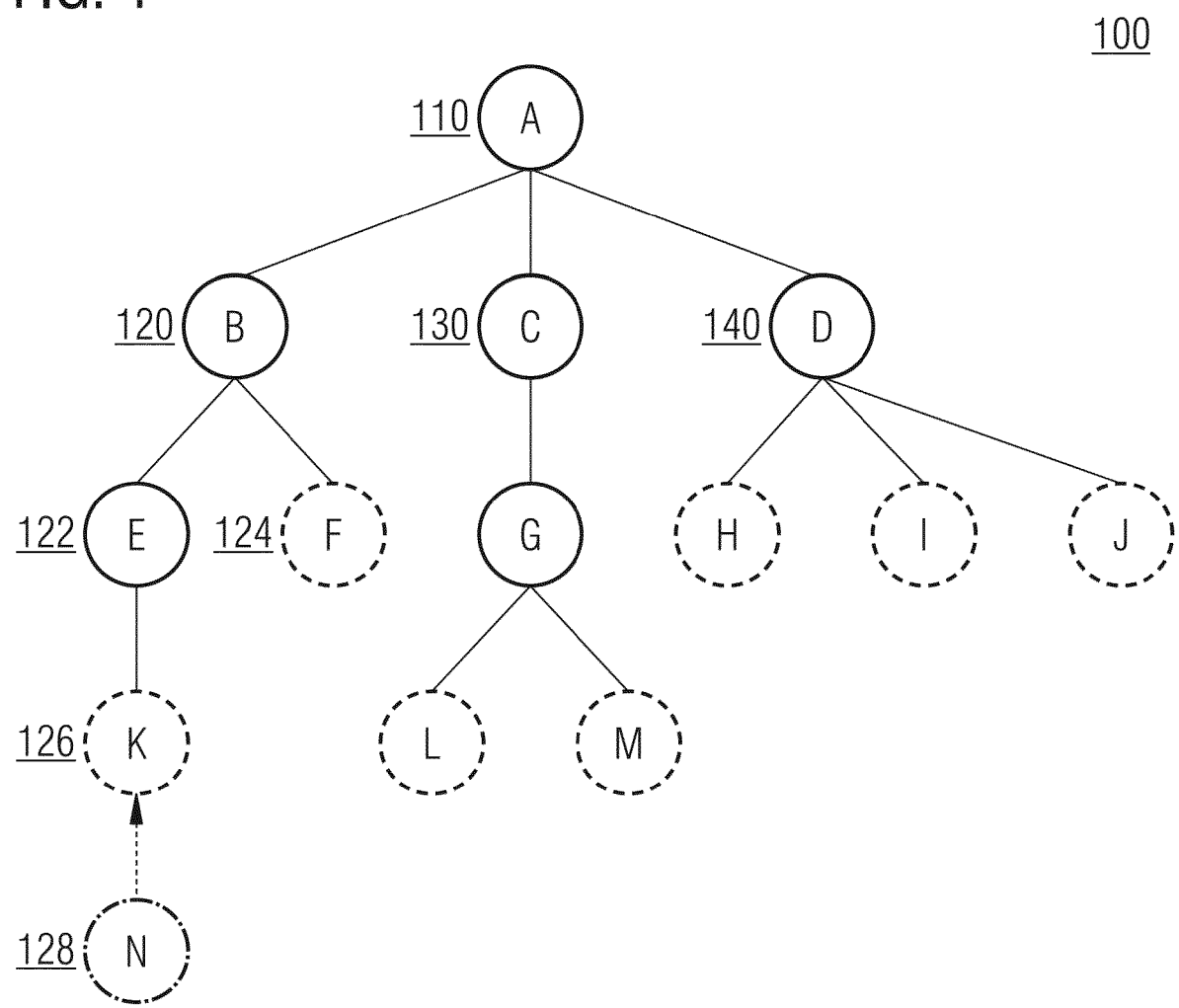
FIG. 1 illustrates a basic configuration of an internet forum.

Some examples are now described in more detail with reference to the enclosed figures. However, other possible examples are not limited to the features of these embodiments described in detail. Other examples may include modifications of the features as well as equivalents and alternatives to the features. Furthermore, the teiminology used herein to describe certain examples should not be restrictive of further possible examples.

Throughout the description of the figures same or similar reference numerals refer to same or similar elements and/or features, which may be identical or implemented in a modified form while providing the same or a similar function. The thickness of lines, layers and/or areas in the figures may also be exaggerated for clarification.

When two elements A and B are combined using an 'or', this is to be understood as disclosing all possible combinations, i.e. only A, only B as well as A and B, unless expressly defined otherwise in the individual case. As an alternative wording for the same combinations, "at least one of A and B" or "A and/or B" may be used. This applies equivalently to combinations of more than two elements.

If a singular form, such as "a", "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms "include", "including", "comprise" and/or "comprising", when used, describe the presence of the specified features, integers, steps, operations, processes, elements, components and/or a group thereof, but do not exclude the presence or addition of one or more other features, integers, steps, operations, processes, elements, components and/or a group thereof.

Embodiments disclosed herein are related to a method for posting a user message of a user in an internet forum. The user may be any entity that could benefit from the internet forum. For example, user may be one or more human beings. The user may alternatively be a machine, a software, a device, a subpart of a machine, system or device, or a collection or combination of the previously mentioned. For instance, a device could be a printed circuit board and could integrate an executable software component, e.g., an artificial intelligence. Thus, the user may be any reasonable entity, human or non-human, that is capable of creating a user message for an internet forum.

An internet forum may comprise computer-implemented software, for example, to perform transactions between the user or external web services and the internet forum or to prepare data for graphical realization. The internet forum may also comprise processing circuitry to execute the software and data storage, for example, to store any data useful to perform the internet forum. Such an internet forum may be a website that typically allows users of the website to post any kind of information in the form of a user message that is available to be viewed by other users of the website. The internet forum may have many different discussion threads relating to a specific topic. A user of such an internet forum may select a discussion thread and then participate in the discussion. Other internet forums may have discussion threads relating to many topics that may be hierarchically organized. To participate in a discussion, a user of such an internet forum may first select a topic and then select the discussion thread of interest. A discussion thread is typically initiated when a person creates an initial message directed to a topic and posts the initial message as a new discussion thread. Other persons may read the initial message and post response (or reply) messages to the discussion thread. Discussion threads typically take the form of a tree structure as sequences of messages branch off into different paths. For example, three different users may post a response message to the initial message, starting three branches, and other users may post response messages to any one of those response messages to extend those branches. In conformity with the tree structure, the initial message may be designated as root post. Any user message, including the initial message, being replied to may be designated as a parent post. Any user message being a response message to a parent post may be designated as child post of the parent post.

As illustrated in FIG. 1, a basic configuration of an internet forum 100 with tree structure may have a root post 110 which may be a topic of a thread of the internet forum 100. The root post 110 may have three branches pointing to child posts 120, 130, 140 of the root post 110. Child post 120 may have child posts 122 and 124. Child post 122, then again, may have a child post 126. Child post 120 may also be designated as parent post of child posts 122 and 124. The rest of the tree structure is built up alike. If a user message 128 is created by a user of the internet forum 100 in response to the child post 126, a new branch may be created between child post 126 and user message 128. Child post 126 may be then the parent post of the user message 128. In other embodiments of the present invention an internet forum may have a different structure, such as a hierarchical structure arranging posts according to a creation date or importance of posts.

An internet forum may have a forum network node being part of a computer system. A computer system may be distributed over a computer network and may include multiple constituent computer systems. Computer systems may, for example, be handheld devices, appliances, laptop computers, desktop computers, mainframes, distributed computer systems, datacenters, or even devices that have not traditionally been considered a computer system, such as wearables. The computer network may comprise any infrastructure to exchange data, such as user message 128, between multiple computer systems. Such infrastructure may comprise servers, network cables, fibre optic cables, routers, etc. The computer network may be the web. The user message 128 may be exchanged via cable or wireless. A computer system may have one or more network nodes, in other words a computer system may have one or more interfaces to the computer network. Likewise, a user of an internet forum 100 may use a computer system with a user network node, for example, to send a user message 128 to a forum network node. Such a user message 128 may comprise any infoitiiation provided by the user. The user message 128 may be translated into machine language by the computer system of the user and may be transferred from the user network node to the forum network node via the computer network. The user message 128 may then be translated back into a human-readable form by the computer system of the internet forum to display the user message 128 to other users of the internet forum.

The user network node and the forum network node may comprise a so-called digital agent. The digital agent may be an electronic device, an online service, or a software program configured to handle a digital identity of the user or the internet forum, respectively. The user may be in control of his/her digital agent, i.e., the user may be authorized to configure the digital agent at will. Generally, a digital identity may comprise information on an entity (user, internet forum) used by computer systems to allow for assessment and authentication of the entity when interacting with other entities without the involvement of human operators. Digital identities may, for example, allow access to parts of computer systems and to services provided by the computer systems to be automated. For this purpose, the digital agent administers one or more digital identifiers. Such a digital identifier may be a code, sign, or token that, for example, comprises a string of characters which may be unique among all digital identifiers used for a certain purpose. The digital identifier "labels" the digital identity, for example, according to a certain scheme. It may inherently carry metadata along with them. A digital agent may operate a so-called digital wallet which may be a data storage solely controlled by the digital agent. The digital agent may store the digital identity, corresponding digital identifiers, and methods for using those in the digital wallet.

Traditional digital identifiers used for identification of entities throughout computer networks may depend on a centralized identity management system controlled by a third party, such as a company or organization providing identity management services. A centralized identity management system may be a centralized information system used to manage the issued digital identifiers and the authentication, authorization, roles, and privileges of the corresponding digital identities. Centralized identity management systems have been deemed as secure since they often use professionally maintained hardware and software. Finally, when an entity needs to verify another entity's digital identity, the verifying entity often needs to go through the centralized identity management system to obtain information verifying and/or authenticating the other entity's digital identity. For instance, a traditional digital identifier may be a password allowing a user (entity) to perfoi in certain transactions with a website, such as an internet forum. The password may be issued by an external authority operating the website or being commissioned by the website provider. The external authority may decide who or what the password identifies and when a usage of the password can be revoked. The password may be useful only in certain contexts and recognized only by certain bodies not of the user's choosing. The password might disappear or cease to be valid with a failure of the website provider. The password or metadata of the password might unnecessarily reveal personal infoiniation. In some cases, the password can be fraudulently replicated and asserted by a malicious third party, which is more commonly known as "identity theft".

An alternative approach may be decentralized identifiers (DIDs) which are a new type of digital identifier independent from any centralized registry, identity provider, or certificate authority. DIDs are based on a self-sovereign identity (SSI) paradigm, meaning they are designed to enable entities to generate their own digital identifiers. Thus, DIDs can be implemented independently of any centralized registry. A DID is a simple text string comprising three parts: 1) a DID URL (Uniform Resource Locators) scheme identifier, 2) an identifier for the DID method, and 3) a DID method-specific identifier. DID methods are the mechanism by which a particular type of DID and its associated DID document are created, resolved, updated, and deactivated according to a DID method specification.

Figure 2:
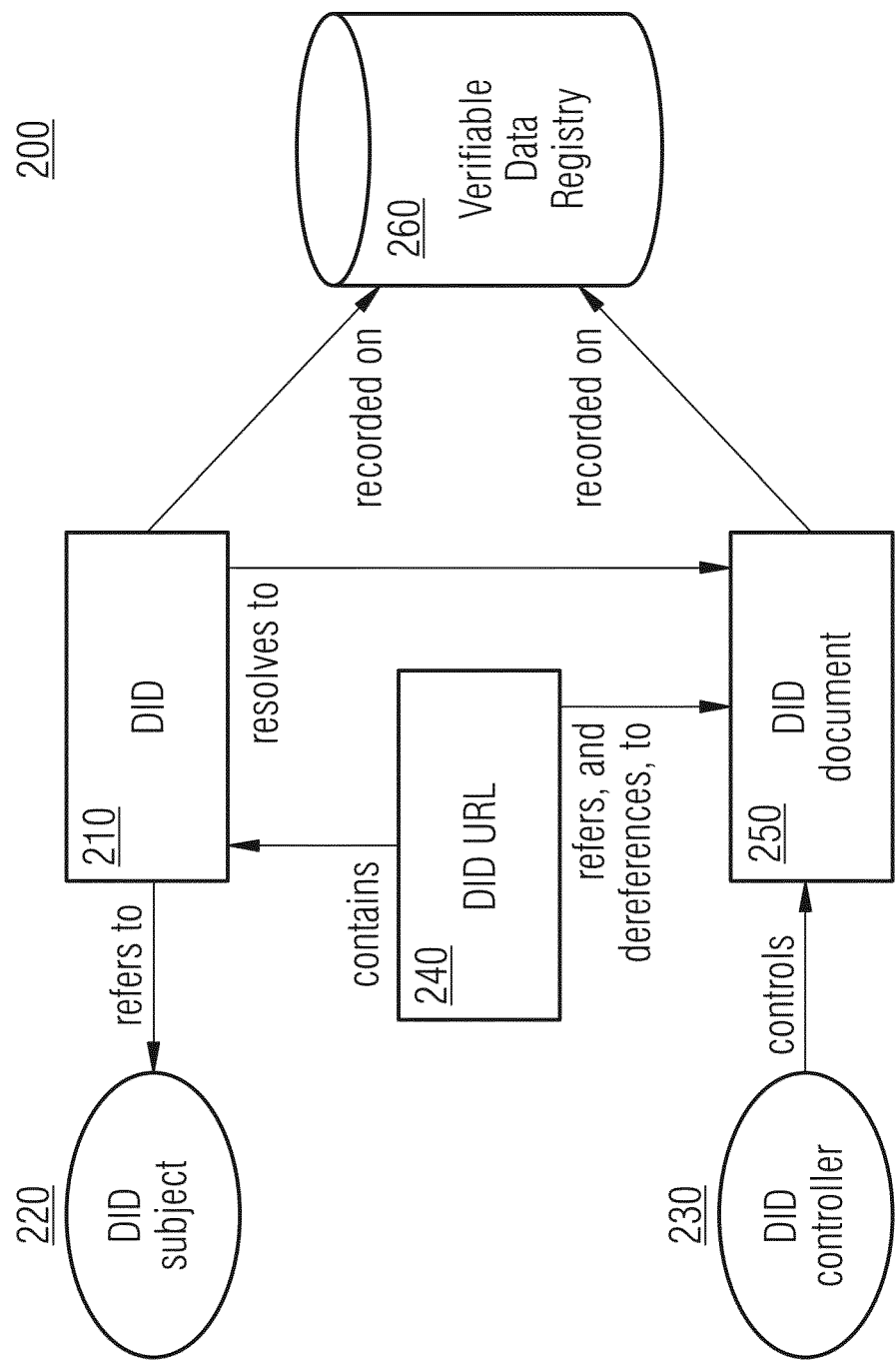
FIG. 2 illustrates a basic architecture of DIDs.

FIG. 2 illustrates a basic architecture 200 for DIDs. A DID 210 refers to any entity (DID subject 220) that a controller of the DID 210 (DID controller 230) decides that it refers to. For instance, a personal individual as DID controller 230 could generate (via his/her digital agent) a DID 210 for his/her car (DID subject 220). DIDs 210 can use DID URLs 240 to associate a DID 210 with a DID document 250, extending the syntax of a basic DID 210 to incorporate other standard URL components such as path, query, and fragment in order to locate a particular resource, for example, a cryptographic public key inside a DID document 250, or a resource external to the DID document 250. In the same manner traditional URLs in the web may resolve to an IP-address (Internet Protocol), a DID URL 240 resolves to a DID document 250. DIDs 210 allow trustable interactions associated with the DID subject 220 as the DID 210 as well as the DID document 250 are recorded on a verifiable data registry 260. Examples for a verifiable data registry 260 are distributed ledgers, decentralized file systems, decentralized databases of any kind, peer-to-peer networks, blockchains, and other forms of trusted data storage. For example, if the DID subject 220 is a private individual, the DID 210 and DID document 250 may rather be recorded on a non-public verifiable data registry, such as a peer-to-peer network which may comprise a digital wallet of the DID controller 230 and/or a digital wallet of another entity involved in a transaction with the DID controller 230. Each DID document 250 can express a set of data (representations) describing the DID subject 220 as well as cryptographic material, verification methods, or service endpoints (core properties), which provide a set of mechanisms enabling a DID controller 230 to prove control of the DID 210 to the other entity. The cryptographic material may be used to prove certain aspects of a digital identity of the DID subject 220 by using a digital signature. In many cases DID controller 230 and DID subject 220 may belong to the same entity. Since the generation and assertion of DIDs 210 is entity-controlled, each entity can have as many DIDs 210 as to maintain a desired separation of digital identities, digital personas, and interactions. The use of DIDs 210 can be scoped appropriately to different contexts. DIDs 210 support interactions with other entities via computer systems, when the interactions require a digital identification, and provide control over how much personal data should be revealed.

A digital identity mentioned in association with embodiments of the present disclosure is defined broadly. The digital identity may be associated with the aforementioned DID, traditional digital identifier, or other kind of digital identifier. However, in some embodiments of the present disclosure, DIDs may be used to overcome privacy-related or trust-related issues.

FIG. 3 illustrates a method 300 for posting a user message 128 of a user in an internet forum 100 according to embodiments of the present disclosure. The method 300 comprises receiving 310, at a forum network node, a user request for posting the user message 128 in the internet forum 100 from a user network node, the user network node being associated with a digital identity of the user, the forum network node being associated with a digital identity of the internet forum, the forum network node having an interface to a distributed ledger, the user request indicating a parent post 126 the user message 128 relates to, the parent post 126 being part of the internet forum 100. The internet forum 100 may be a website displaying user messages 110, 120, 122, 124, 126, 130, 140, etc. in tree-like or other structure. The forum network node may be an interface to a computer network and implemented in a computer system, the computer network enabling data transfers at least between the user network node and the forum network node. The forum network node may represent a digital agent handling a digital identifier assigning a "label" to the digital identity of the internet forum 100. In other words, the digital identifier represents a "name" of the digital identity, wherein the name may be unique among other names used in the same context in order to achieve distinguishability. The digital identity of the internet forum 100 may comprise any infoi illation associated with the internet forum 100, such as an endpoint of the internet forum 100, information about the internet forum provider, etc. Likewise, the user network node may represent a digital agent handling a digital identifier assigning a "label" to the digital identity of the user. The user request may comprise data transferred via the computer network from the user network node to the forum network node indicating that the user may want to post the user message 128 in the internet forum 100. For this purpose, the user may have selected a parent post 126 that he/she wants to reply to, wherein the parent post 126 may have already been published in the internet forum 100. The user request may comprise information about the parent post 126, so the user message 128 may be assigned to this parent post 126 by the forum network node. Receiving 310 may be performed after the user request may have been sent by the user network node to the forum network node via the computer network.

The method 300 further comprises generating 320, at the forum network node, transaction data for the user message 128 and a hash of the transaction data, the transaction data comprising a hash of the user message 128 and the hash of the parent post 126. A hash can be thought of as a hash value output by a hash function. The hash function may be used by the forum network node to hash the user message 128, the parent post 126 and, then again, the resulting transaction data. A hash function may be any function used to map data, e.g., the user message 128, which is of arbitrary size to fixed-size values (hashes). A hash function usually works "one-way", i.e., the hash function cannot be reversed. The hash may be used to index a fixed-size table, called hash table, which holds the data or records, or pointers to the data.

The method 300 further comprises writing 330 the hash of the transaction data and the transaction data on the distributed ledger. The distributed ledger may be any verifiable data registry, e.g., a blockchain, comprising sections or blocks, each of them comprising a record (transaction data). The distributed ledger may differ from the verifiable data registry 260. The distributed ledger may represent a growing list of sections comprising transaction data indexed by the hash of the transaction data, wherein each transaction data may link the hash of the user message 128 to the hash of the parent post 126. The distributed ledger may be verifiable in a way that if a section of ledger is altered, all subsequent sections of ledger are altered. In the case of a blockchain a section may comprise the transaction data and the hash of the transaction data, a 32-bit whole number called a nonce, and a 256-bit number (a hash) wedded to the nonce. The nonce is randomly generated when a section is created, which then generates a section header hash. In a blockchain every section has its own unique nonce and hash, but also references the hash of the previous section in the chain. So, mining a section (creating a new section) may be time-consuming, especially on large blockchains. Mining usually requires special software to solve the complex mathematical task of finding a nonce that generates an accepted hash. When the length of the nonce is 32 bits and the length of the hash is 256 bits, there are roughly four billion possible nonce-hash combinations that may be mined before a suitable combination is found. Making a change to any section earlier in the blockchain may require "re-mining" not only the one block, but also the subsequent blocks. In this manner, posting the user message 128 in the internet forum 100 may be recorded publicly and in an immutable way. Thus, the user message 128 may not be altered or deleted secretly. The transaction data associated with the posting of the user message 128 comprises a hash of the user message 128 linked to a hash of the parent post 126. Consequently, the user message 128 posted on the internet forum 100 may not be moved secretly to a different parent post. Any alteration of the user message 128 may be transparent to the user and other users of the internet forum 100.

Figure 4:
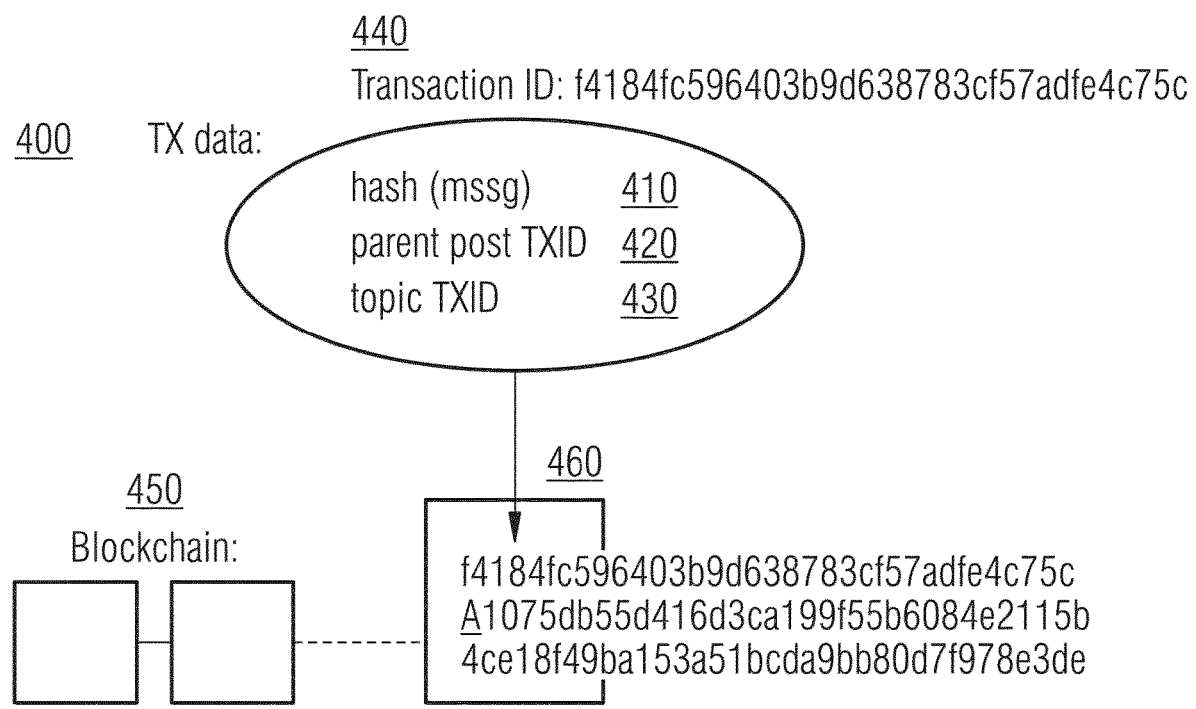
FIG. 4 illustrates an example of transaction data.

FIG. 4 illustrates an example of transaction data 400. The transaction data 400 may comprise a hash 410 of a user message 128, a hash 420 of a parent post 126 (labelled as parent post TXID), and, additionally, a hash 430 of a topic post 110 (labelled as topic TXID). The hash 420 of the parent post 126 may be used to refer the user message 128 to an existing parent post 126 of an internet forum 100. The hash 430 of the topic post 110 may refer to the root post of a thread of the internet forum 1000. The hash 430 of the topic post 110 may be an optional entry to the transaction data 400 in order to provide convenience information to easily find topic related posts in the internet forum 100. A transaction ID (identifier) 440 is assigned to the transaction data 400 by generating a hash 440 of the transaction data 400 (labelled as transaction ID). The hash 440 of the transaction data 400 may conduce to an identification of the transaction data 400 and to a representation of a structure of the internet forum 100. The hash 420 of the parent post 126 may equal a hash of transaction data which was generated when the parent post 126 was created. In this case, it may be easier to rebuild the structure of the internet forum 100 as the transaction data 400 of the user message 128 indicates an index (hash) of transaction data of the corresponding parent post 126. The transaction data 400 and the hash 440 of the transaction data 400 are stored on a distributed ledger, here a blockchain 450. For this purpose, a section 460 is created comprising the transaction data 400 and the hash 440. The section 460 is chained to the existing sections of the blockchain 450.

FIG. 5 illustrates an apparatus 500 for posting a user message 128 of a user in an internet forum 100 according to some embodiments. The apparatus 500 comprises a user network node 510 being associated with a digital identity of the user. The user network node 510 may be a network node in a computer network, e.g., the internet, connecting the user network node 510 to a forum network node 520. The user network node 510 may comprise a digital agent of the user which manages the digital identity of the user. The digital agent may be a software running on a user device, such as a smartphone, laptop, or other computer system, or a cloud-based service. The digital agent may be continuously, "24/7", available and may handle requests automatically on behalf of the user. The user may use his/her user device to post a user message 128 in the internet forum 100. The digital agent may store the user message 128 on a user data storage, such as a digital wallet. The user data storage may be any data storage which may be controlled by the user. The user data storage may comprise several data storage devices of several computer systems. The user data storage may be synchronized and backed up. The digital agent may provide access to the user message 128 stored on the user data storage when requested by the forum network node 520. The internet forum 100 may have a tree-like structure. For demonstration purposes, exemplary forum posts 110, 126 of the internet forum 100 are shown. Forum post 110 may be a topic post, forum post 126 may be a parent post of the user message 128. In other embodiments of the present disclosure, the interne forum 100 may have a different structure, such as a hierarchical structure, and comprise posts of different number, in a different order and with different references. The internet forum 100 may optionally comprise a QR-code 530 (Quick Response) which comprise information about how the user network node 510 can establish a (secure) network path via the computer network to the forum network node 520. The QR-code 530 may comprise a public key associated with a digital identifier of the forum network node 520 or an (DID) URL thereto. The user device may scan the QR-code 530 to retrieve the information of the QR-code 530. Instead of the QR-code 530, a hyperlink to the forum network node 520 can be integrated into the internet forum 100. If the forum network node 520 can be connected without any additional information, e.g., no authorization of the internet forum 100 or user is needed, the QR-code 530 can be omitted.

The user may type the user message 128 and assign it to the parent post 126. Optionally, the corresponding topic post 110 is captured at the user network node 510. At the user network node 510, a user request for posting the user message 128 in the internet forum 100 is generated, wherein the user request indicates the parent post 126. At the forum network node 520, the user request is received. The forum network node 520 may be a network node associated with the internet forum 100 in a computer network connecting the user network node 510 to the forum network node 520. The forum network node 520 may comprise a digital agent of the internet forum 100 which manages the digital identity of the internet forum 100. The digital agent may be a software running on a computer system. The forum network node 520 has an interface 522 to a distributed ledger 450. The distributed ledger 450 may be any decentralized, distributed network that includes various computer systems that are in communication with each other. For example, the distributed ledger 450 may include a first distributed section 546, a second distributed section 544, a third distributed section 542 and any number of additional distributed sections 548 as illustrated by the dots. The distributed ledger 450 may operate according to any known standards or methods for distributed ledgers. Examples of traditional distributed ledgers that may correspond to the distributed ledger 450 include, but are not limited to, Bitcoin (BTC), Ethereum, and Litecoin.

At the forum network node 520, transaction data 400 for the user message 128 and a hash 440 of the transaction data 400 may be generated. The transaction data 400 may comprise a hash 410 of the user message 128 and a hash 420 of the parent post 126. Therefore, the user message 128 may be hashed by a hash function which maps the user message 128 to a fixed-size value. Likewise, the parent post 126 may be hashed. To link the user message 128 to the parent post 126, the transaction data 400 may be then again hashed, yielding the hash 440 of the transaction data 400. At the forum network node 520, the transaction data 400 and the hash 440 of the transaction data 400 are written onto the distributed ledger 450. The forum network node 520 may therefore comprise one or more drivers that are configured to work with specific distributed ledgers such as distributed ledger 450 so that the transaction data 400 and the hash 440 of the transaction data 400 comply with the underlying methods of that distributed ledger. The transaction data 400 and the hash 440 of the transaction data 400 may jointly form a new section of the distributed ledger 450. The new section may be chained to the section 542 preceding the new section.

Figures 2, 6:
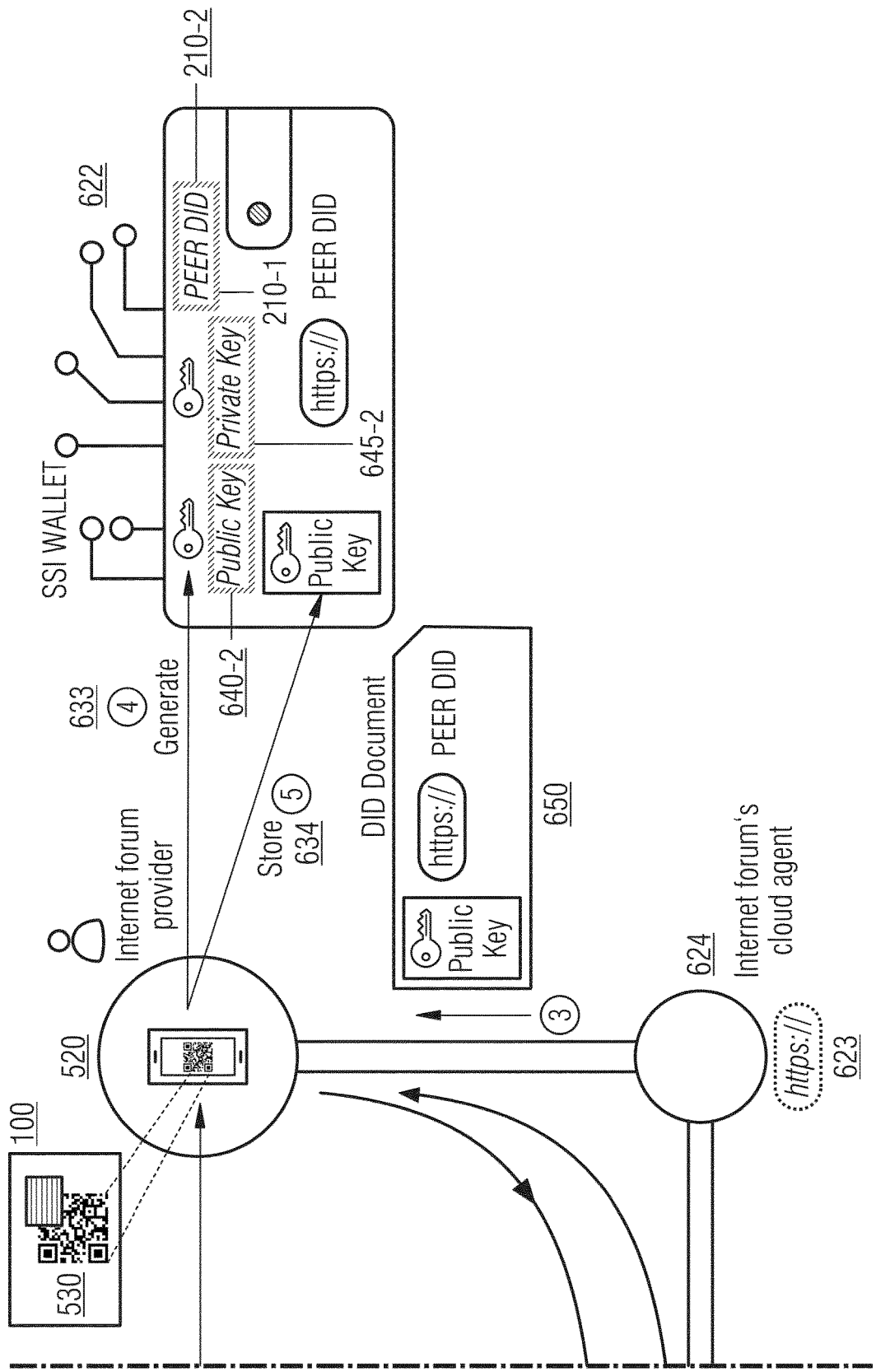
FIG. 6 illustrates an apparatus for requesting a digital signature of a user network node.

FIG. 6 illustrates an apparatus 600 for requesting a digital signature 630 from the user network node 510 according to some embodiments. In this case, DIDs may be used to establish a secure network path between a user network node 510 and a forum network node 520. The forum network node 520 may provide a QR-code 530 which is shown in the internet forum 100. The QR-code 530 may provide information on how to connect to an endpoint 623 of the internet forum 100. The endpoint 623 may be managed by a cloud agent 624 of the forum network node 520. The cloud agent 624 may be a mediator network node. The forum network node 520 may comprise a digital agent and may store data associated a digital identity of the internet forum 100 in a digital wallet 622. A user 610 of the internet forum 100 may have a user device 611, such as a smartphone, on which a user network node 510 may be operated. The user network node 510 may comprise a digital agent. The user device 611 may further comprise a user data storage, here a digital wallet 612, on which the user network node 510 may store data associated with the digital identity of the user 610.

As a first step 630, the user 610 may scan the QR-code 530 with his/her user device 611, retrieving, at the user network node 510, the information about the endpoint 623 of the internet forum 100. As a second step 631, the user network node 510 may generate a DID 210-1 which may be specific for the secure network path between the user network node 510 and the forum network node 520. The DID 210-1 relates to the digital identity of the user 610 and indicates an asymmetric key pair comprising a public key 640-1 and a private key 645-1. The user network node 510 stores the DID 210-1, the public key 640-1 and the private key 654-1 on the digital wallet 612. As a third step 632, the user network node 510 may send a DID document 650 via a cloud agent 614 of the user network node 510 to the endpoint 623. The DID document 650 may comprise a user message 128 created by the user 610, an endpoint 613 of the user network node 510, the public key 640-1, the DID 210-1, and optionally further information about the digital identity of the user 610, such as name, date of birth, etc. The further infoi illation may be disclosed according to the user's 610 choosing. The cloud agent 624 may forward the DID document 650 to the forum network node 520. As a fourth step 633, the forum network node 520 may generate a DID 210-2 which may be specific for the secure network path between the user network node 510 and the forum network node 520. The DID 210-2 relates to the digital identity of the internet forum 100 and indicates an asymmetric key pair comprising a public key 640-2 and a private key 645-2. As a fifth step 634, the forum network node 520 may store the public key 640-1, the endpoint 613 and the DID 210-1 in the digital wallet 622.

The endpoint 613 can be thought of a network address of the user network node 510. The forum network node 520 may be able to connect to the user network node 510 for further transactions. For example, if the forum network node 520 refreshes the internet forum 100, the forum network node 520 may request (a plaintext of) a user message 128. The user network node 510 may have stored the user message 128 in the digital wallet 612. In this manner, the user 610 may be in full control of his/her user message 128, the internet forum 100 may not have to provide long-term data storage to store the user message 128, and the user message 128 may not be altered secretly on the internet forum 100.

Referring to FIG. 6: The forum network node 520 may generate transaction data 400 for the user message 128 and store it on a distributed ledger 450 (not shown). As a sixth step 635, the forum network node 520 may request a digital signature 630 for the transaction data 400. Therefore, the forum network node 520 may send a DID document 652 to the endpoint 613 via the secure network path. The DID document 652 may comprise the public key 640-2, the DID 210-2, and the transaction data 400. The forum network node 520 may have encrypted a content of the DID document 652 by using the public key 640-1. As a seventh step 636, the user network node 510 may decrypt the DID document 652 by using the private key 645-1 and store the public key 640-2, the DID 210-2 and transaction data 400 in the digital wallet 612. As an eight step 637, the user network node 510 may generate the digital signature 630 and send it to the forum network node 520 via the secure network path. The digital signature 630 may comprise the transaction data 400 which may be encrypted by using the private key 645-1 and the public key 640-2. Alternatively, or additionally, the digital signature 630 may comprise further information about the digital identity of the user 610 which may be required by the forum network node 520. Instead of exchanging the transaction data 400 in the steps 635 and 637, a token may be exchanged. The token may be encrypted likewise by the forum network node 520 and may be decrypted by using the private key 640-1 at the user network node 510. As only the user network node 510 may have the private key 640-1, the digital signature 630 may not be forged.

By using the DIDs 210-1 and 210-2, not only the transaction data 400 may be authorized by the user 610 (by means of the digital signature 630) but also exchanging data via the secure network path may be encrypted and, thus, protected from interception. Additionally, this approach enables to prove the digital identity of the user 610 without a centralized third party involved. Alternatively, to the use of DIDs 210-1 and 210-2, a traditional digital identifier may be used to prove the digital identity of the user 610. Such a traditional digital identifier may be validated by a centralized third party, such as a trusted certifier.

Additionally or alternatively, the forum network node 520 may store the DID 210-2 and a corresponding DID document on a distributed ledger, such as a verifiable data registry 260 (not shown). The corresponding DID document may comprise the endpoint 623 of the internet forum 100. Then, the user network node 510 may, instead of scanning the QR-code 530 in the first step 630, look up the DID 210-2 and the corresponding DID document on the distributed ledger 260. Then, steps 631 to 637 may be performed likewise. The QR-code 530 may optionally provided as a user-friendly way to exchange the endpoint 623.

Figure 7:
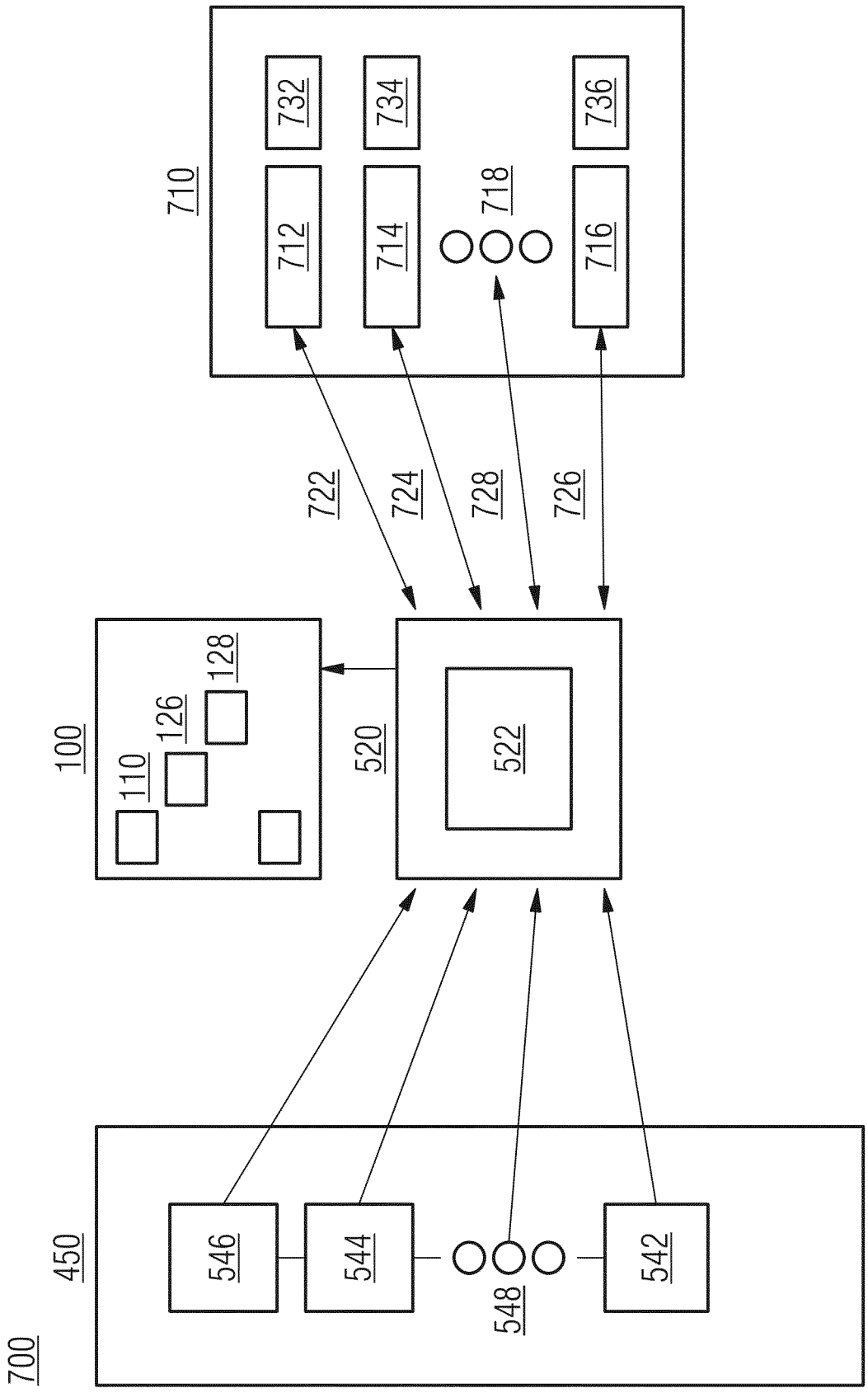
FIG. 7 illustrates an apparatus for refreshing the internet forum.

FIG. 7 illustrates an apparatus 700 for refreshing the internet forum 100 according to some embodiments. Refreshing may be needed when a cache of the internet forum 100 expires. For performance reasons, a forum network node 520 associated with the internet forum 100 may provide the cache to the internet forum 100. The cache may be a copy of prior user message and may include any caching techniques with expiration times. The forum network node 520 may read prior transaction data stored on a distributed ledger 450. The prior transaction data is priorly generated transaction data for prior user messages of prior users of the internet forum 100. For instance, a prior user using a prior user network node 716, representing a digital identity of the prior user, may have created a prior user message 736 and stored it on a prior user data storage associated with the prior user network node 716. The prior user message 736 may have been posted in the internet forum 100 and displayed as forum post 126. A corresponding transaction data (prior transaction data) may have been stored by the forum network node 520 in section 546 of the distributed ledger 450. The forum network node 520 may read the prior transaction data from section 546 and retrieve a hash of the prior user message 736 from the prior transaction data. Then, the forum network node 520 may establish a network path 726 to the prior user network node 716 to request the prior user message 736 corresponding to the hash. For this purpose, the forum network node 520 may have stored a network address of the prior user network node 716 on a digital wallet 622 (not shown) and may have linked the network address with the hash of the prior user message 736. After having received the request from the forum network node 520, the prior user network node 716 may send (a plaintext of) the prior user message 736. The forum network node 520 may then send the prior user message 736 to the internet forum 100 for refreshing it. Additionally, the hash of a prior parent post, being the parent post of the prior user message 736, may be retrieved from the prior transaction data for restoring a structure of the internet forum 100. The prior user may have changed (or deleted) the prior user message 736 since the last refreshing of the internet forum 100. In this case, after refreshing the internet forum 100 the prior user message 736 is shown in the internet forum 100 in its latest version (which may be null) and the forum post 126 may be overwritten.

For fully refreshing the internet forum 100, prior transaction data of prior user messages 732, 734, 736, etc. may be retrieved by going through blocks 542, 544, 546, 548, etc. of the distributed ledger 450. The forum network node 520 may look up hashes of the prior user messages 732, 734, 736, etc. in the prior transaction data. A connection to prior user network nodes 710, e.g., prior user network nodes 712, 714, 716, etc. may be needed to restore (a plaintext of) the prior user messages 732, 734, 736, etc. The forum network node 520 may look up the network addresses of the prior user network nodes 712, 714, 716, etc. and establish network paths 722, 724, 726, etc. to the corresponding prior user network nodes 712, 714, 716, etc. Via the network paths 722, 724, 726, etc. the forum network node 520 may retrieve the plaintext from the prior user messages 732, 734, 736, etc. corresponding to the hashes of the prior user messages 732, 734, 736, etc. Each prior user network node 712, 714, 716, etc. may have stored on an own digital wallet 612 (not shown), respectively, the corresponding prior user message, indexed by the hash of the corresponding prior user message.

Figure 8:
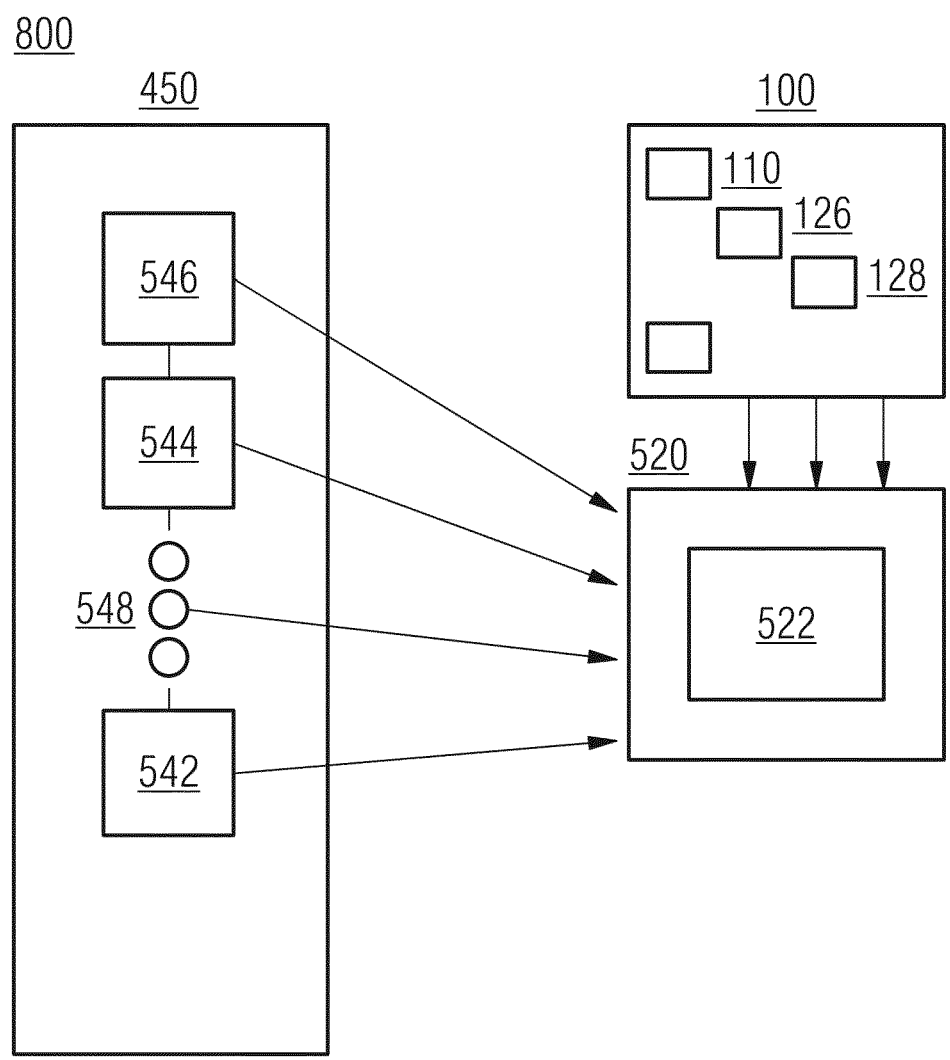
FIG. 8 illustrates an apparatus for verifying an integrity of the internet forum.

When the forum network node 520 may want to check if forum posts 110, 126, 128, etc. of the internet forum 100 were altered without permission of the corresponding prior users who created the forum posts 110, 126, 128, etc., the forum network node may perfoiiii an integrity check of the internet forum 100. FIG. 8 illustrates an apparatus 800 for verifying an integrity of the internet forum 100. The forum network node 520 may read prior transaction data stored in sections 542, 544, 546, 548, etc. of a distributed ledger 450. The forum network node 520 may look up hashes of prior user messages in the prior transaction data. The forum network node 520 may compare the hashes of the prior user messages with corresponding hashes of the forum posts 110, 126, 128, etc. of the internet forum 100. If one of the prior user messages 110, 126, 128, etc. was altered, its hash may differ from a hash of a corresponding (an original) prior user message stored on the distributed ledger 450.

Figure 9:
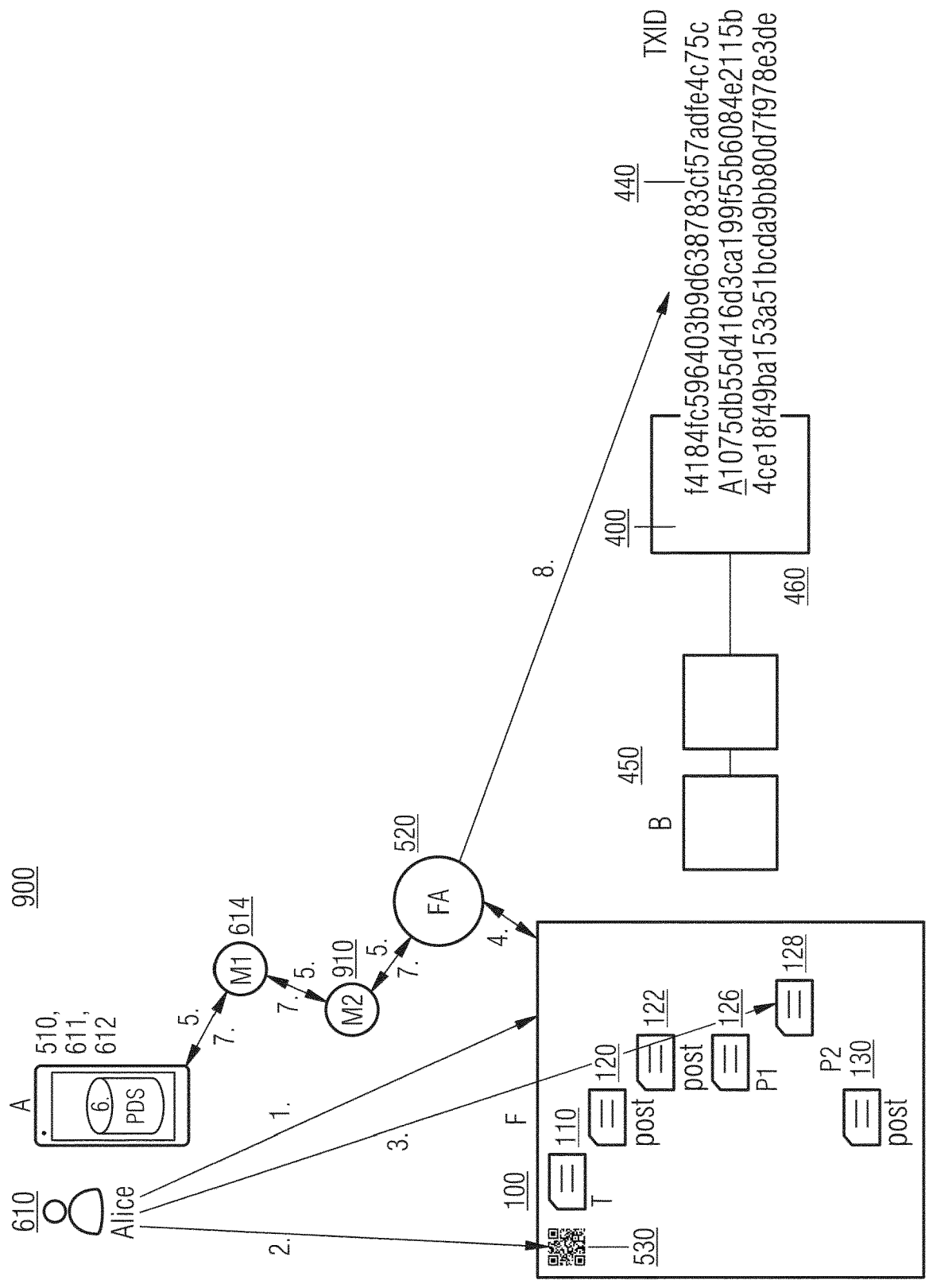
FIG. 9 illustrates a systemfor posting the user message of the user in the internetforum.

FIG. 9 illustrates a system for posting a user message 128 of a user 610 in an internet forum 100. The user 610 may open a website of the internet forum 100 and look up the QR-code 530 indicating information about how to connect to a forum network node 520 associated with the internet forum 100. The user 610 may have a user device 611 with a digital wallet 612 to which a user network node 510 may be associated. The user 610 may use the user device 611 to scan the QR-code 530 to establish a network path to the forum network node 520. Optionally, the user 610 may use two mediator network nodes 614 and 910 to establish the network path. The mediator network nodes 614, 910 may be part of mediators. Generally, a mediator may be a participant in agent-to-agent message delivery. The mediator may have own digital identifiers and may deliver user message, such as the user message 128, after decrypting an outer envelope to reveal a forward request. Types of mediators may include a service that hosts many cloud-based digital agents, such as cloud agent 614, at a single endpoint to provide herd privacy, a cloud-based agent that routes between/among network nodes, such as the user network node 510 and the forum network node 520, or a relay that passes along agent-to-agent messages, such as the user message 128, without any further decryption/encryption. Mediators may support routes that use multiple transports, routes that are not fully known (or knowable) to the sender, routes that pass through mix networks, and other network concepts. The user 610 may specify a network path to the forum network node 520 through any number of mediator network nodes. Only the mediator network node nearest to the forum network node 520 may be visible to the forum network node 520. So, the user 610 may hide his/her digital identity by using mediator network nodes 614, 910.

Referring to FIG. 9: The user 610 may type the user message 128 in reply to a parent post 126. The forum network node 520 may look up on a blockchain 450 a hash of a prior transaction data associated with the parent post 126 and may prepare transaction data 400 of the user message 128 and a hash of the transaction data 440. The transaction data 400 may comprise a hash of the user message 128 and a hash of the parent post 126. The forum network node 520 may send the transaction data 400 and the user message 128 to the user network node 510. The user network node 510 may store the user message 128 on a digital wallet 612 located on the user device 611. Alternatively, the user network node 510 may store the user message 128 in a personal data storage. The personal data storage may be a cryptographically secured computer data storage to which the user network node 510 may have access to. The user network node 510 may sign the transaction data 400 with a private key 654-1 (not shown) generated by the user network node 510. The user network node 510 may send the signed transaction data 400 back to the forum network node 520. The forum network node 520 may write the signed transaction data 400 in a section 460 of the blockchain 450. When caches of the internet forum 100 may need to be refreshed, the forum network node 520 may connect to the user network node 510 and request (a plaintext of) the user message 128.

To summarize, the methods and apparatuses for posting a user message of a user in an internet forum may be advantageous because the internet forum may be checked for integrity. Altering, moving, deleting, etc. the user message when displaying the user message on the internet forum may easily be detected by means of integrity checks. If the user message is not displayed correctly in the internet forum, the user may be able to prove that. The internet forum may still decide to not show the user message, but this may be noticed by the user or other users of the internet forum. The internet forum may not have to store the user message on a permanent basis as the user may store the user message. The internet forum may refresh and cache at will. As the plaintext of the user message may be stored at the user's side, the storage capacity and cost needed for the internet forum may be reduced. Only the user may be able to delete his/her user message, meaning, when a cache of the internet forum may expire, the plaintext of the user message may not be provided anymore.

Note that the present echnology can also be configured as described below:

(1) Method for posting a user message of a user in an internet forum, the method comprising:
  receiving, at a forum network node, a user request for posting the user message in the internet forum from a user network node, the user network node being associated with a digital identity of the user, the forum network node being associated with a digital identity of the internet forum, the forum network node having an interface to a distributed ledger, the user request indicating a parent post the user message relates to, the parent post being part of the internet forum;
  generating, at the forum network node, transaction data for the user message and a hash of the transaction data, the transaction data comprising a hash of the user message and a hash of the parent post; and
  writing the hash of the transaction data and the transaction data on the distributed ledger.

(2) The method of (1), further comprising sending, at the forum network node, the transaction data to the user network node for requesting a digital signature for the transaction data from the user network node, the digital signature proving the digital identity of the user.

(3) The method of (2), further comprising receiving, at the forum network node, the digital signature for the transaction data from the user network node.

(4) The method of (2), further comprising receiving, at the forum network node, the digital signature for the transaction data from a mediator network node, the mediator network node routing data between the forum network node and the user network node.

(5) The method of any of (1) to (4), further comprising storing, at the forum network node, a network address of the user network node linked to the hash of the user message on a computer data storage.

(6) The method of any of (1) to (5), further comprising refreshing the internet forum by reading prior transaction data stored in the distributed ledger, the prior transaction data being priorly generated transaction data for at least one prior user message of at least one prior user of the internet forum;
  looking up a hash of the at least one prior user message in the prior transaction data;
  looking up a network address of at least one prior user network node linked to the hash of the at least one prior user message on a computer data storage, the at least one prior user network node being associated with a digital identity of the at least one prior user;
  by using the network address of the at least one prior user network node, establishing a network path between the forum network node and the at least one prior user network node; and
  retrieving via the network path from the at least one prior user network node the at least one prior user message corresponding to the hash of the at least one prior user message.

(7) The method of any of (1) to (6), further comprising caching, at the forum network node, a copy of the user message on a computer data storage.

(8) The method of any of (1) to (7), further comprising verifying an integrity of the internet forum, wherein verifying the integrity comprises
  reading prior transaction data stored in the distributed ledger, the prior transaction data being priorly generated transaction data for at least one prior user message of at least one prior user of the internet forum;
  looking up a hash of the at least one prior user message in the prior transaction data;
  comparing the hash of the at least one prior user message with a hash of at least one forum post in the internet forum, the at least one forum post corresponding to the at least one prior user message.

(9) A computer program having a program code for performing a method of any one of (1) to (8), when the computer program is executed on a programmable hardware device.

(10) Apparatus for posting a user message of a user in an internet forum, comprising processing circuitry configured to:
  receive, at a forum network node, a user request for posting the user message in the internet forum from a user network node, the user network node being associated with a digital identity of the user, the forum network node being associated with a digital identity of the internet forum, the forum network node having an interface to a distributed ledger, the user request indicating a parent post the user message relates to, the parent post being part of the internet forum;

generate, at the forum network node, transaction data for the user message and a hash of the transaction data, the transaction data comprising a hash of the user message and a hash of the parent post; and write the hash of the transaction data and the transaction data on the distributed ledger.

(11) Apparatus for posting a user message of a user in an internet forum, comprising processing circuitry configured to:

send, at a user network node, a user request for posting the user message in the internet forum to a forum network node, the user network node being associated with a digital identity of the user, the forum network node being associated with a digital identity of the internet forum, the user request indicating a parent post the user message relates to, the parent post being part of the internee forum;

store the user message on a user data storage at a user network node;

receive, at the user network node, transaction data from the forum network node, the transaction data comprising a hash of the user message and a hash of the parent post; and sign, at the user network node, the transaction data with a digital signature using a digital identifier.

(12) System for posting a user message of a user in an internet forum, the system comprising processing circuitry configured to send, at a user network node, a user request for posting the user message in the internet forum to a forum network node, the user network node being associated with a digital identity of the user, the forum network node being associated with a digital identity of the internet forum, the forum network node having an interface to a distributed ledger, the user request indicating a parent post the user message relates to, the parent post being part of the internet forum;

store the user message on a user data storage at a user network node, the user data storage being managed by the user;

receive the user request at the forum network node;

generate, at the forum network node, transaction data for the user message and a hash of the transaction data, the transaction data comprising a hash of the user message and a hash of the parent post;

send, at the forum network node, the transaction data to the user network node for requesting a digital signature for the transaction data from the user network node, the digital signature proving the digital identity of the user;

receive, at the user network node, the transaction data from the forum network node;

sign, at the user network node, the transaction data with the digital signature using a digital identifier of the user network node;

receive, at the forum network node, the digital signature for the transaction data from the user network node;

write, at the forum network node, the transaction data and the hash of the transaction data on the distributed ledger.

The aspects and features described in relation to a particular one of the previous examples may also be combined with one or more of the further examples to replace an identical or similar feature of that further example or to additionally introduce the features into the further example.

Examples may further be or relate to a (computer) program including a program code to execute one or more of the above methods when the program is executed on a computer, processor, or other programmable hardware component. Thus, steps, operations, or processes of different ones of the methods described above may also be executed by programmed computers, processors, or other programmable hardware components. Examples may also cover program storage devices, such as digital data storage media, which are machine-, processor- or computer-readable and encode and/or contain machine-executable, processor-executable, or computer-executable programs and instructions. Program storage devices may include or be digital storage devices, magnetic storage media such as magnetic disks and magnetic tapes, hard disk drives, or optically readable digital data storage media, for example. Other examples may also include computers, processors, control units, (field) programmable logic arrays ((F)PLAs), (field) programmable gate arrays ((F)PGAs), graphics processor units (GPU), application-specific integrated circuits (ASICs), integrated circuits (ICs) or system-on-a-chip (SoCs) systems programmed to execute the steps of the methods described above.

It is further understood that the disclosure of several steps, processes, operations, or functions disclosed in the description or claims shall not be construed to imply that these operations are necessarily dependent on the order described, unless explicitly stated in the individual case or necessary for technical reasons. Therefore, the previous description does not limit the execution of several steps or functions to a certain order. Furthermore, in further examples, a single step, function, process, or operation may include and/or be broken up into several sub-steps, -functions, -processes or -operations.

If some aspects have been described in relation to a device or system, these aspects should also be understood as a description of the corresponding method. For example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

The invention claimed is:

1. A method for posting a user message of a user in an internet forum, the method comprising:

receiving, at a forum network node, a user request for posting the user message in the internet forum from a user network node, the user network node being associated with a digital identity of the user, the forum network node being associated with a digital identity of the internet forum, the forum network node having an interface to a distributed ledger, the user request indicating a parent post the user message relates to, and the parent post being part of the internet forum;

generating, at the forum network node, transaction data for the user message including a hash of the user message and a hash of the parent post;

generating, at the forum network node, a hash of the transaction data; and writing the hash of the transaction data and the transaction data on the distributed ledger.

2. The method according to claim 1, further comprising sending, at the forum network node, the transaction data to the user network node for requesting a digital signature for the transaction data from the user network node, the digital signature proving the digital identity of the user.

3. The method according to claim 2, further comprising receiving, at the forum network node, the digital signature for the transaction data from the user network node.

4. The method according to claim 2, further comprising receiving, at the forum network node, the digital signature for the transaction data from a mediator network node, the mediator network node routing data between the forum network node and the user network node.

5. The method according to claim 1, further comprising storing, at the forum network node, a network address of the user network node linked to the hash of the user message on a computer data storage.

6. The method according to claim 1, further comprising refreshing the internet forum by:

reading prior transaction data stored in the distributed ledger, the prior transaction data being priorly generated transaction data for at least one prior user message of at least one prior user of the internet forum;

looking up a hash of the at least one prior user message in the prior transaction data;

looking up a network address of at least one prior user network node linked to the hash of the at least one prior user message on a computer data storage, the at least one prior user network node being associated with a digital identity of the at least one prior user;

by using the network address of the at least one prior user network node, establishing a network path between the forum network node and the at least one prior user network node; and retrieving via the network path from the at least one prior user network node the at least one prior user message corresponding to the hash of the at least one prior user message.

7. The method according to claim 1, further comprising caching, at the forum network node, a copy of the user message on a computer data storage.

8. The method according to claim 1, further comprising verifying an integrity of the internet forum, wherein verifying the integrity comprises:

reading prior transaction data stored in the distributed ledger, the prior transaction data being priorly generated transaction data for at least one prior user message of at least one prior user of the internet forum;

looking up a hash of the at least one prior user message in the prior transaction data; and comparing the hash of the at least one prior user message with a hash of at least one forum post in the internet forum, the at least one forum post corresponding to the at least one prior user message.

9. The method according to claim 1, wherein the digital identity of the user is associated with a decentralized identifier of the user.

10. The method according to claim 9, wherein the digital identity of the internet forum is associated with a decentralized identifier of the internet forum.

11. The method according to claim 10, further comprising establishing a secure network path between the user network node and the forum network node using the decentralized identifier of the user and the decentralized identifier of the internet forum.

12. The method according to claim 1, wherein the digital identity of the internet forum is associated with a decentralized identifier of the internet forum.

13. The method according to claim 1, further comprising establishing a secure network path between the user network node and the forum network node using a digital identifier associated with the digital identity of the user and a digital identifier associated with the digital identity of the internet forum.

14. A non-transitory computer readable medium storing a computer program having a program code which, when executed on a programmable hardware device, causes the programmable hardware device to perform the method according to claim 1.

15. An apparatus for posting a user message of a user in an internet forum, comprising processing circuitry configured to:

receive, at a forum network node, a user request for posting the user message in the internet forum from a user network node, the user network node being associated with a digital identity of the user, the forum network node being associated with a digital identity of the internet forum, the forum network node having an interface to a distributed ledger, the user request indicating a parent post the user message relates to, and the parent post being part of the internet forum;

generate, at the forum network node, transaction data for the user message including a hash of the user message and a hash of the parent post;

generate, at the forum network node, a hash of the transaction data; and write the hash of the transaction data and the transaction data on the distributed ledger.

16. An Apparatus for posting a user message of a user in an internet forum, comprising processing circuitry configured to:

send, at a user network node, a user request for posting the user message in the internet forum to a forum network node, the user network node being associated with a digital identity of the user, the forum network node being associated with a digital identity of the internet forum, the user request indicating a parent post the user message relates to, and the parent post being part of the internet forum;

store the user message on a user data storage at the user network node;

receive, at the user network node, transaction data from the forum network node, the transaction data comprising a hash of the user message and a hash of the parent post; and sign, at the user network node, the transaction data with a digital signature using a digital identifier.

17. A system for posting a user message of a user in an internet forum, the system comprising processing circuitry configured to send, at a user network node, a user request for posting the user message in the internet forum to a forum network node, the user network node being associated with a digital identity of the user, the forum network node being associated with a digital identity of the internet forum, the forum network node having an interface to a distributed ledger, the user request indicating a parent post the user message relates to, the parent post being part of the internet forum;

store the user message on a user data storage at the user network node, the user data storage being managed by the user;

receive the user request at the forum network node;

generate, at the forum network node, transaction data for the user message including a hash of the user message and a hash of the parent post;

generate, at the forum network node, a hash of the transaction data;

send, at the forum network node, the transaction data to the user network node for requesting a digital signature for the transaction data from the user network node, the digital signature proving the digital identity of the user;

receive, at the user network node, the transaction data from the forum network node;

sign, at the user network node, the transaction data with the digital signature using a digital identifier of the user network node;

receive, at the forum network node, the digital signature for the signed transaction data from the user network node; and write, at the forum network node, the signed transaction data and the hash of the transaction data on the distributed ledger.

* * * * *